Aug. 4, 1953 C. O. MALLINCKRODT 2,647,957

TRANSISTOR CIRCUIT

Filed June 1, 1949

2 Sheets-Sheet 1

INVENTOR
C. O. MALLINCKRODT
BY
N. A. Ewing
ATTORNEY

Aug. 4, 1953

C. O. MALLINCKRODT 2,647,957

TRANSISTOR CIRCUIT

Filed June 1, 1949

2 Sheets-Sheet 2

INVENTOR
C. O. MALLINCKRODT
BY
[signature]
ATTORNEY

Patented Aug. 4, 1953

2,647,957

UNITED STATES PATENT OFFICE 2,647,957

TRANSISTOR CIRCUIT

Charles O. Mallinckrodt, Summit, N. J., assignor to Bell Telephone Laboratories, Incorporated, New York, N. Y., a corporation of New York Application June 1, 1949, Serial No. 96,577

4 Claims. (Cl. 179—171)

This relates in general to electrical translation devices including transistors, and more particularly to the manner of supplying direct-current bias for the operation of such devices.

It has been discovered that electrical current is amplified in a circuit including as its active element a transistor, which comprises a plurality of electrodes connected in a specified manner to a treated block of semiconducting material. Such a device has been described in detail by J. Bardeen and W. H. Brattain in their Patent 2,524,035, granted October 3, 1950. In accordance with their disclosure, the body of a transistor may comprise a block of germanium, the crystalline structure of which is believed to be altered by the presence of slight quantities of impurities to provide different conductive types, which are known, for example, as "P-type" and "N-type." When the major portion of the block comprises material of one type, for example, N-type, the surface of which has been treated in a manner which is believed to produce a thin "barrier" layer of P-type, the block exhibits remarkable amplifying properties. Formed point contacts, respectively denoted the "emitter" and the "collector," make rectifying contact with the treated surface of the germanium block. A third electrode, denoted the "base," makes low resistance contact with the body of the block.

In the specification hereinafter, it has been assumed that the body of the transistors disclosed comprises N-type semiconducting material having a treated or barrier layer of P-type. However, it is apparent from a study of Bardeen-Brattain, supra, that transistors comprising a major portion of P-type material with a barrier layer of N-type material will be equally suitable for substitution in the circuits described hereinafter. In the latter case, the polarity of the biases on the emitter and collector electrodes will be the reverse of those indicated in the drawings, and described hereinafter with reference thereto.

Assuming the major portion of the transistor body to be N-type, the Bardeen-Brattain disclosure teaches that for optimum operation the emitter electrode should be so biased with respect to the base electrode that a small current of positive charge, say .3 milliampere, flows from the emitter to the base through the semiconducting body. In most instances the desired result is produced by operating the emitter electrode at a direct-current potential which is of the order of one volt positive with respect to the base electrode. However, because of certain variations in the internal impedances of different transistor units, the transistor may sometimes be operated efficiently when the biasing potential applied to the emitter electrode with respect to the base electrode is negligible or even slightly negative. It has generally been found that the transistor operates most efficiently when a relatively high negative bias, of for example 40 volts, is applied to the collector electrode with respect to the base electrode.

Experimental data have shown that the gain changes in translation devices including transistors, which result from variations in the properties of individual transistor units with age, or when one transistor unit is replaced by another, are small when the emitters are biased on a constant current instead of on a constant voltage basis, i. e., when substantially constant direct current is supplied to the respective emitters.

It is, therefore, a principal object of this invention to provide such constant current emitter bias in transistor circuits without introducing factors into such circuits which adversely affect their stability or frequency response by producing an appreciable element of positive feedback between the output and input terminals.

In accordance with the present invention, the aforesaid object is realized in a transistor amplifier stage in grounded base arrangement, wherein emitter biasing current is supplied from a source of direct-current power separate from the collector biasing source. This is connected between the base and emitter electrodes in series with an element having a high resistance relative to the internal transistor resistance from emitter to base through the semiconducting body. Hence, the direct-current potential of the emitter biasing source is made so large relative to the direct-current potential drop between the emitter and base electrodes, that the positive biasing current into the emitter is substantially independent of variations in the electrical properties of the transistor.

In accordance with one embodiment of the invention, the biasing circuit, comprising a positive potential source in series with a connecting high resistance element, is connected in parallel with the signal source between the base and the emitter electrodes. A blocking condenser is inserted between the signal source and the biasing circuit to prevent the signal source from acting as a shunt across the biasing circuit.

In accordance with another modification of the invention, which is particularly useful when the signal source is ungrounded, the series biasing circuit, comprising a positive potential source in series with a high resistance connecting element, is connected to the base electrode in series with the signal source. A blocking condenser connected across the biasing circuit between the base electrode and the low potential terminal of the signal source acts as a signal by-pass circuit.

The application of constant current bias in accordance with the present invention is illustrated in a superheterodyne radio receiver comprising a plurality of radio frequency, intermediate frequency, and audio frequency transistor amplifier stages wherein the emitters and collectors are respectively connected in tandem through high resistance leads to separate sources of positive and negative rectified alternating current.

Additional objects, features and advantages of the present invention will be apparent from a study of the specification and drawings hereinafter, wherein.

Figure 1:
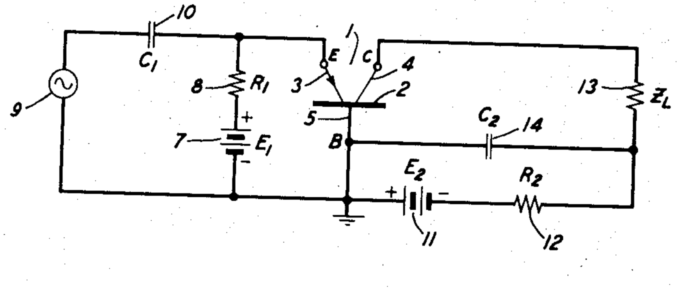
Fig. 1 shows one embodiment of a grounded base transistor amplifier including a biasing circuit in accordance with the present invention which is connected in parallel with the signal source.
Figure 2:
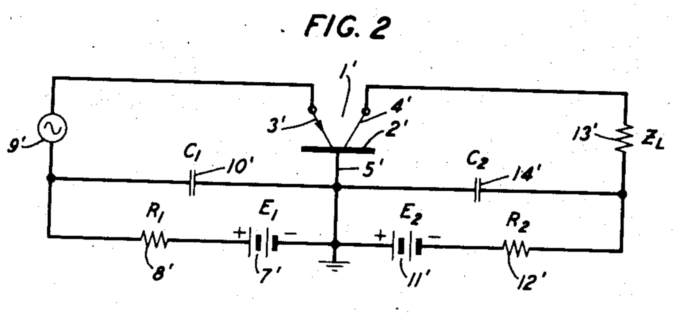
Fig. 2 shows another embodiment of a biasing circuit in accordance with the present invention which is connected in series with the signal source in a grounded base transistor amplifier.
Figure 3A:
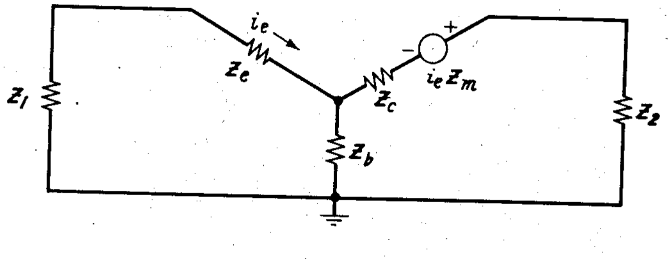
Figure 3B:
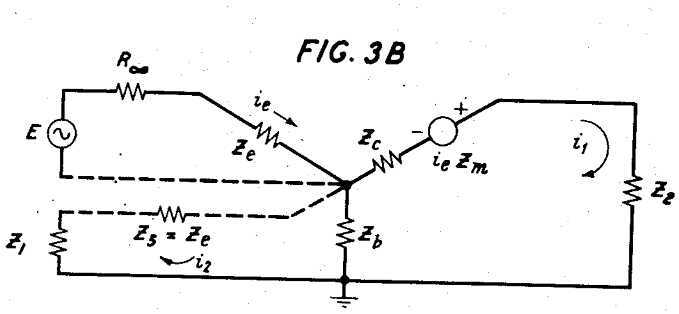
Figure 4:
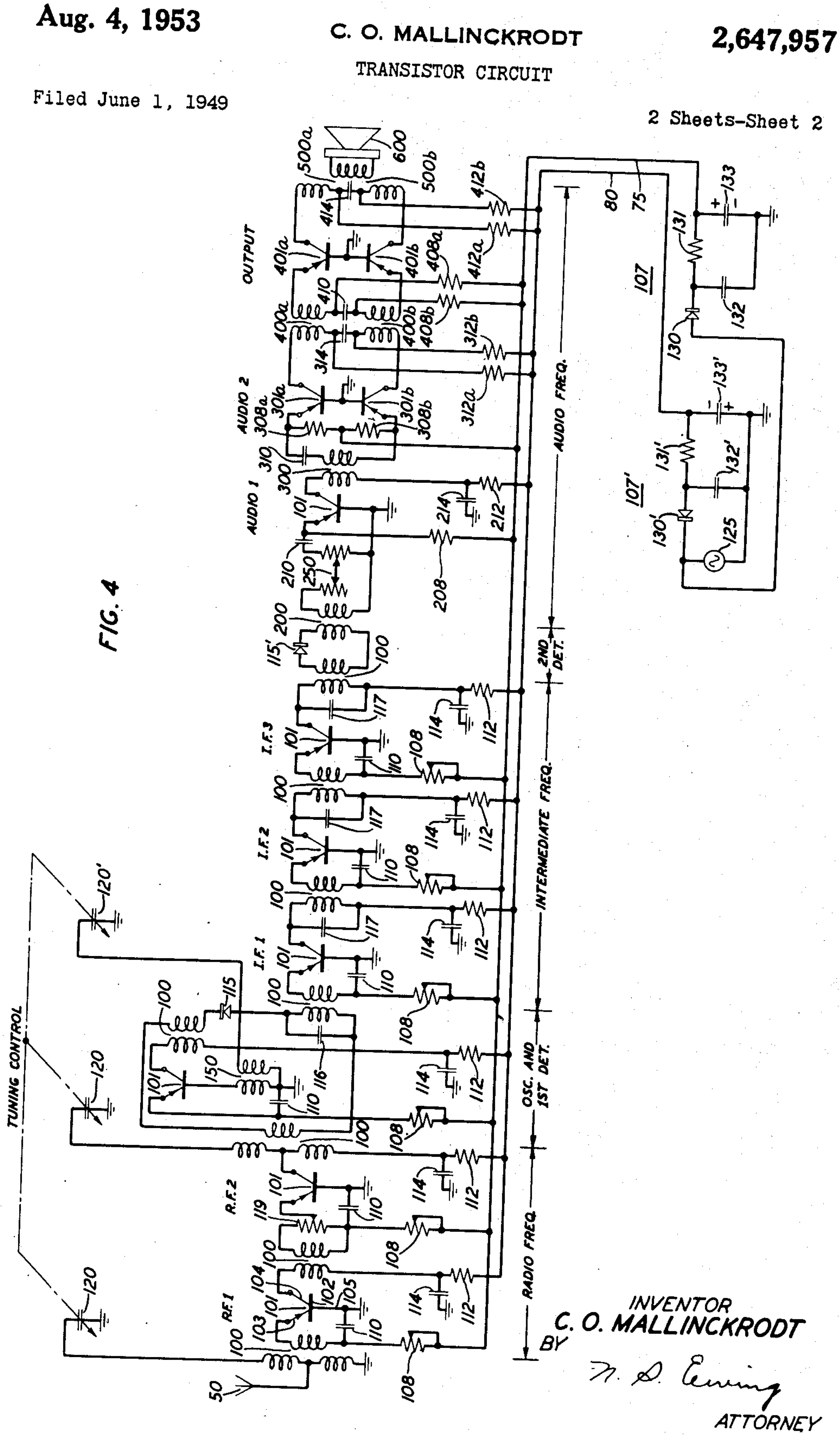

Figs. 3*a* and 3*b* are equivalent diagrams of the transistor amplifier circuits of Figs. 1 and 2 which illustrate certain theoretical considerations; and Fig. 4 is a schematic diagram of a superheterodyne transistor radio receiver in which constant current circuits in accordance with the present invention are utilized for biasing the emitters of a plurality of transistor amplifier stages.

The circuit of the transistor amplifier of Fig. 1 will now be described in detail. The transistor 1 comprises a crystalline block of a semiconducting material such as germanium, which has been treated in accordance with the teachings of Bardeen-Brattain, supra, and to the treated surface of which are connected in rectifying contact, the emitter and collector electrodes 3 and 4, respectively. The base electrode 5 makes low resistance contact with the body of the block.

The emitter electrode 3 is biased positively through a circuit which includes the direct-current potential source 7, the negative terminal of which is connected to the grounded base electrode 5, and the positive terminal of which is connected through an element 8 of resistance $R_1$ to the emitter 3. Typical values for $R_1$ will be discussed hereinafter. The potential $E_1$ of the direct-current source 7 is made many times larger than the direct-current potential drop between emitter and base electrodes, so that the biasing current which flows through the resistance 8, the emitter 3 and the base 5 to ground is substantially independent of variations in the electrical properties of the individual transistor, such as might be produced by aging or replacement of one unit by another.

The alternating-current signal source 9 is connected with its grounded terminal to the base electrode 5. The blocking condenser 10, having a capacitance $C_1$, presenting a negligible impedance at signal frequencies, is interposed between the high potential terminal of the signal source 9 and the emitter electrode 3. The condenser 10, which in the case of an alternating-current signal source prevents the biasing currents from flowing into the signal source, may be omitted if the signal source is open to direct current.

Biasing current for the collector electrode 4 is obtained from the negative direct-current source 11 connected with its positive terminal to the grounded base electrode 5. Its negative terminal is connected to the collector by way of a series circuit, which includes the resistance element 12, having a value $R_2$, such as will be defined more particularly hereinafter, and the load circuit 13 having an impedance $Z_L$. The resistance 12 prevents the collector current from exceeding a safe operating value, and may be omitted whenever the direct-current resistance of the load 13 is sufficiently large to serve this purpose. The condenser 14, having a capacitance $C_2$, and connected between the grounded base electrode 5 and the low potential terminal of the load 13, serves as a signal by-pass across the direct-current potential source 11 and the resistance element 12.

Fig. 2 of the drawings shows an alternative constant current biasing circuit which may be used when the signal source is ungrounded.

Referring in detail to the schematic of Fig. 2, the transistor 1′ is similar to the transistor 1 described with reference to Fig. 1. The signal source 9′ is connected with its high potential terminal to the emitter 3′ and its low potential terminal in series to ground with the emitter biasing circuit, which includes the positive direct-current potential source 7′ connected in series with the high resistance element 8′. Signal currents are by-passed around the potential source 7′ and the high resistance element 8′ by the capacitance 10′, which is connected between ground and the low potential terminal of the source 9.

The biasing circuit for the collector electrode 4′ is substantially similar to the biasing circuit for the collector 4 described with reference to Fig. 1. Moreover, circuits of Figs. 1 and 2 operate in a substantially similar manner to supply constant biasing current to the respective emitters.

For the purpose of theoretical discussion, a grounded base transistor amplifier of the type shown in Figs. 1 and 2 can be reduced to an equivalent impedance mesh as shown in Fig. 3. A more complete discussion of the circuit parameters, $Z_e$ representing the emitter impedance, $Z_c$ the collector impedance, $Z_b$ the base impedance, and $Z_m$ the net transimpedance is given in application Serial No. 96,500, filed on even date herewith. To simplify the discussion which follows, the reactive components of these impedances will be neglected and the parameters will be designated as $R_e$, $R_c$, $R_b$ and $R_m$.

The following illustrative example is given to show approximately what values may be assigned to the circuit elements in Figs. 1 and 2. Accordingly, the transistor 1 is assumed to have the following circuit parameters:

$$R_e = 600\omega$$
$$R_c = 13{,}630\omega$$
$$R_b = 70\omega$$
$$R_m = 31{,}730\omega$$

Additionally, the optimum direct-current emitter and collector currents $I_e$ and $I_c$ for the illustrative transistor 1 will be respectively assumed to be 0.3 milliampere and 1.5 milliamperes. Under these conditions the direct-current emitter voltage $V_e$ is assumed to be 0.55 volt relative to ground potential.

Assuming that the positive direct-current supply voltage is taken at 10 volts, then the required value of $R_1$ of the resistance element 8′ may be obtained by letting $$E_1 = 10 \text{ volts}$$
$$V_e = 0.55 \text{ volt}$$

and $$I_e = 0.3 \text{ milliampere}$$

Substituting these values in the formula:

$$R_1 = \frac{E_1 - V_e}{I_e} \quad (1)$$

the value of the resistance 8 may be computed as follows:

$$R_1 = \frac{10 - .55}{.3 \times 10^{-3}} = 31{,}500\omega$$

Experimental data shows that transistors of similar construction to the transistor 1 described, have direct-current emitter voltages which range from the value of +0.55 volt, as given, down to a value of +0.12 volt. If the transistor 1, having the illustrative values described, were replaced in the circuits of Figs. 1 and 2 with a unit having an emitter voltage of, for example, +0.12 volt, the value of $I_e$ of the emitter bias current would be changed as follows:

$$I_e = \frac{E_1 - V_e'}{R_1} = \frac{10 - 0.12}{31{,}500} = 0.314 \text{ milliampere} \quad (2)$$

This departure of the emitter bias current from the design value of 0.3 milliampere is so small that its effect upon the performance of the circuit may be considered negligible.

In the case of the particular transistor unit described, the direct-current collector voltage is assumed to be 8.1 volts. However, other units of the same type of construction have been found to have collector voltages as high as 75 volts. Therefore, in the design of a circuit, such as described with reference to Figs. 1 and 2, which is adapted to operate in a satisfactory manner with any one of these transistors, the value $R_2$ of the resistances 12, 12′ of Figs. 1 and 2, would be so chosen as to make the collector current equal to 1.5 milliamperes when the collector voltage which will be designated $V_c$ is about half way between the two extreme cases given above; that is when the collector voltage is $$\frac{75 + 8.8}{2} = 41.9 \text{ volts}$$

If the available negative direct-current supply voltage is, for example, 130 volts, the desired value of $R_2$ would be as follows:

$$R_2 = \frac{E_2 - V_c}{I_c} = \frac{130 - 41.9}{1.5 \times 10^{-3}} = 58{,}700 \text{ ohms} \quad (3)$$

The value of collector current which flows when the particular transistor unit described is in the circuit is as follows:

$$I_c = \frac{E_2 - V_c'}{R_2} = \frac{130 - 8.8}{58{,}700} = 2.06 \text{ milliamperes} \quad (4)$$

Such a value is well within the safe operating limit.

The foregoing discussion assumes that the direct-current resistance of the load impedance $Z_L$ is zero ohms.

It will be assumed that the output impedance of the illustrative transistor unit is approximately 14,000 ohms and its input impedance 600 ohms. For maximum power gains, therefore, the amplifier is preferably operated on a matched impedance basis, so that the impedance of the signal source working into the amplifier input is 600 ohms; and the amplifier output works into a load impedance of 14,000 ohms.

In the circuit of Fig. 1, the biasing resistor 8, having a value $R_1$, is shunted directly across the input circuit, accordingly reducing the gain of the amplifier. However, since $R_1$ has a value which is much larger than the impedance of the amplifier input circuit, the effect is small. With the value assumed above, the resistance component $R_s$ of the total impedance of the input circuit at signal frequencies is 600/2 or 300 ohms. The resistance of the element 8, $R_1$, is 31,500 ohms; hence, the gain is reduced by the factor $$\frac{R_1}{R_s + R_1} = \frac{31{,}500}{300 + 31{,}500} = \frac{31{,}500}{31{,}800} = 0.99 \quad (5)$$

or expressing the result in decibels 0.1 decibel. In the case of the circuit of Fig. 2, this effect is absent because the resistor 8′ is by-passed by the capacitor 10′.

An important feature of the biasing methods shown in Figs. 1 and 2 is that they involve no circuit elements which increase the positive feedback in the circuit, the positive feedback being only that which is inherently present in the transistors. This feature is advantageous because of the fact that an appreciable amount of positive feedback in an amplifier circuit imposes additional design requirements on the circuit to insure its stability.

The formula for positive feedback in the circuit of Fig. 1 may be derived through the use of an equivalent circuit such as shown in Fig. 3*a* of the drawings. In this schematic, the transistor is replaced by its standard equivalent network. Element $Z_1$ represents the combined impedance of the signal source 9, the resistance element 8, and capacitor 10. $Z_2$ represents the combined impedance of the load 13, the capacitor 14, and the resistance element 12.

Feedback may be expressed in terms of the transmission around a complete loop in the circuit. To obtain this quantity for the circuit as shown in Fig. 3*a*, let us make the assumption that the feedback loop of the equivalent circuit of Fig. 3*a* can be replaced by a fictitious circuit such as indicated in Fig. 3*b* of the drawings wherein the feedback loop transversed by the collector output current can be opened up and terminated by an impedance $Z_5$, equal to the emitter input impedance $Z_e$, the impedance $Z_5$ being connected directly between the impedance $Z_1$ and the junction point of $Z_b$ and $Z_e$ in the manner indicated in the figure.

Assume further that a fixed voltage E is impressed on the emitter electrode in the manner indicated, thereby causing an emitter current $i_e$ to flow in the emitter impedance $Z_e$. The impressed emitter current $i_e$ produces a voltage $i_eZ_m$ in the collector "generator," whereby an output current $i_1$ is induced to flow out of the collector and into the load $Z_L$ in the direction indicated. It is seen that:

$$i_1 = \frac{i_eZ_m}{Z_c + Z_2 + \frac{(Z_e + Z_1)Z_b}{Z_e + Z_1 + Z_b}} \quad (6)$$

Hence, the current $i_2$, which is thereby caused to flow in the feedback loop in the direction indicated in Fig. 3*b*, assumes the following value:

$$i_2 = i_1\frac{Z_b}{Z_b + Z_1 + Z_e} = \frac{i_eZ_mZ_b}{(Z_c + Z_2)(Z_b + Z_1 + Z_e) + Z_b(Z_e + Z_1)} \quad (7)$$

From the above, a coefficient of feedback in the transistor circuit can be derived which corresponds to the $\mu\beta$ of a vacuum tube amplifier circuit. This is defined as the ratio of the current flowing into the feedback loop to the current flowing in the load at the output of the complete feedback loop and can be expressed as follows:

$$\text{Feedback coefficient } (\mu\beta)=\frac{i^2}{i_e}=\frac{Z_m Z_b}{(Z_1+Z_e)(Z_c+Z_2)+Z_b(Z_e+Z_1+Z_c+Z_2)} \quad (8)$$

The above formula is also applicable to the circuit of Fig. 2, in which case $Z_1$ represents the combined impedance of the signal source 9', the resistance element 8' and the capacitor 10'.

The critical condition for self-oscillation in the circuit described in the foregoing paragraphs occurs when the feedback coefficient $\mu\beta$ assumes a value equal to unity, and its phase angle is equal to zero. For all values in which this ratio is less than unity, the circuits indicated in Fig. 1 and Fig. 2 are stable. The Formula 8 above shows that the smaller the value of the base impedance $Z_b$, the smaller will be the amount of positive feedback. As may be seen from inspection of the Formula 8, positive feedback is maximum when the input and output terminations are zero impedances.

Experimental data show that although the feedback coefficient $\mu\beta$ exceeds unity in the case of certain transistors, in the case of others the values are very much smaller than unity, even though the transistors exhibit relatively high gains. For example, the illustrative unit described shows a gain of approximately 14 decibels and a feedback coefficient $\mu\beta$ equal to 0.24, the latter value applying for the condition in which the input and output terminations are zero impedances. It thus appears that by appropriate design of the transistor parameters, the value of the feedback coefficient can be made small enough so that the possibility of self-oscillation is completely eliminated; and hence no special requirements need be imposed upon the circuit to prevent self-oscillation. Furthermore it is possible to design transistors having values of $\mu\beta$ considerably smaller than that of the units mentioned above.

Another important property of the circuit shown in Fig. 1, or Fig. 2, is that when the base impedance $Z_b$ is small enough so that its effect on the operation of the circuit is negligible, the input impedance of the circuit is independent of the output termination, and the output impedance is independent of the input termination. The reason for this may be understood by assuming that the value of $Z_b$ is zero in the equivalent circuit in Fig. 3*a*, since there is then no coupling path between the input and output portions of the circuit. This property is advantageous in a number of possible usages of transistor amplifiers. For example, if an amplifier of this type is used as a repeater in a telephone system, the reflections at the amplifier input depend upon the value of the input impedance. If the input impedance were not independent of the output termination, the reflections would be increased by possible deviations of the output termination from its nominal value.

The operational stability, which is inherent in the biasing arrangements described with reference to Figs. 1 and 2, is particularly desirable in a complex circuit comprising a plurality of stages, and hence a large number of transistor units, such as, for example, a superheterodyne radio receiver. Prior to the development of constant current biasing in accordance with the present invention, it was found that the operation of a radio receiver employing a large number of transistor units was relatively unpredictable, because of the change in the characteristics of the individual transistors through aging and the replacement of one unit with another.

Fig. 4 shows the schematic diagram of a superheterodyne radio receiver comprising a plurality of transistor stages provided with constant current bias in accordance with the present invention, a factor which has largely contributed to its reliable operation over an extended test period. The eight transistor stages comprising the circuit are biased for operation by tandem connections from each of the emitters through individual high resistance elements to a common source of positive rectified alternating current, and similar tandem connections between the respective collectors and a common source of negative rectified alternating current.

The circuit comprising the superheterodyne radio receiver shown schematically in Fig. 4 includes the following components: a receiving antenna 50, two radio frequency amplifier stages, an oscillator stage, a first detector stage, three intermediate frequency amplifier stages, a second detector stage, a first audio frequency amplifier stage, and second and third audio frequency amplifier stages, each connected in push-pull relation, and the output from which drives a conventional loudspeaker unit. Each stage is coupled to the preceding and succeeding stage through one of the step-down transformers numbered 100 to 500, which have their turns ratios so designed that they work from the high impedance output of the collector of one stage into the low impedance input of the emitter of the next stage. Each of the amplifier and oscillator stages mentioned includes a transistor unit 101, **301*a*, 301*b*, 401*a*, 401*b* in grounded base connection which corresponds to the transistor 1 described with reference to Figs. 1 and 2 hereinbefore, and each of which includes a corresponding emitter 103, a collector 104, and a base connection 105**.

Positive biasing current is furnished to the emitters 103, etc. in each of the stages from the direct-current power supply 107, which includes a 110-volt 60-cycle source of alternating-current rectified through a selenium rectifier circuit 130. A simple resistance-capacitance filter network is used to reduce the 60-cycle component of the rectifier output and its harmonics. This includes the 16,000-ohm resistance element 131 connected in series with the positive pole of the selenium rectifier 130, the condensers 132 and 133 being connected in parallel between the terminals of resistance 131 and ground.

It will be apparent that the emitter biasing circuit for each of the transistors in the radio frequency intermediate frequency and oscillator stages is substantially similar to that indicated in Fig. 2 of the drawings, the rectified alternating-current supply circuit 107 corresponding to the source 7'. The positive direct-current supply voltage at the output of the rectifier circuit 107 is approximately +140 volts with respect to the ground potential. In each of the radio frequency, intermediate frequency and oscillator stages, the current from this source is fed to the emitter 103 of the respective transistor 101 by way of a 1.3-megohm potential divider 108 which corresponds to the resistance element 8′ of Fig. 2. The potential divider 108 serves initially to determine the optimum emitter biasing current. The .1-microfarad capacitors 110 in each of the stages mentioned serve to by-pass signal current around the direct-current emitter supply 107 and the respective biasing resistors 108, and correspond to the capacitor 10′ of Fig. 2.

In the first audio frequency amplifier stage A1, emitter biasing current is furnished through a circuit substantially similar to that indicated in Fig. 1 of the drawings, which includes a resistance element 208, of the order of 450,000 ohms, connected between the emitter 203 and the power lead 75 to the positive pole of the power supply circuit 107. Likewise, biasing current is furnished to the twin emitters of the transistors 301*a*, 301*b* in the A2 audio frequency stage arranged in push-pull relationship, through twin 200,000-ohm resistance elements 308*a* and 308*b*, each of which is connected between a respective one of the emitters of the push-pull transistors 301*a*, 301*b* and a common terminal to the power lead 75. In this stage, the 4-microfarad blocking capacitor 310 connected in series with the signal input circuit serves the same general purpose as the capacitor 10 in Fig. 1.

In the output audio stage, A3, which likewise comprises a pair of transistors 401*a*, 401*b* connected in push-pull relation, emitter biasing current is furnished by the twin 100,000-ohm resistance elements 408*a* and 408*b* which connect the power lead 75 to the low potential terminals of the twin transformer secondaries 400*a*, 400*b* connected in series with the respective emitter circuits. As in the previously described stages, the 4-microfarad capacitance element 410 is connected to by-pass signal currents around the biasing resistors 408*a* and 408*b* and the power source 107 at audio frequencies.

Circuits similar to those described in the foregoing paragraphs for furnishing biasing current to the emitters are utilized for supplying bias to the collectors in the several stages, wherein collector bias is supplied by connections to the negative direct-current supply source 107′ through the power lead 80. The source 107′ includes a selenium rectifier 130′, which is connected to the 110-volt 60-cycle alternating-current source 125. As in the case of the positive power supply, a resistance-capacitance filter network functions to reduce the 60-cycle component and its harmonics in the rectifier output. This includes the 16,000-ohm resistance element 131′ in series with the negative pole of the rectifier 130′, and the condensers 132′ and 133′ connected in shunt between the respective terminals of the respective terminals of the resistance 131′ and ground.

In each of the radio frequency amplifier, oscillator and intermediate frequency amplifier stages, the respective collector circuit is connected to the power lead 80 through a resistance element 112, which is of the order of 39,000 ohms. A by-pass circuit for signal current in each of the aforesaid circuits is provided by the $\frac{1}{10}$-microfarad condenser 114, which corresponds to the condenser 14 in Fig. 1.

The collector bias current for the first audio stage A1 is furnished, in a similar manner, through the 75,000-ohm resistance element 212 connected between the collector circuit and the power lead 80, the power circuit being by-passed to ground for signal currents through the 1-microfarad condenser 214. Bias current to the twin collectors of the second audio amplifier stage A2 is furnished through the twin 50,000-ohm resistance elements 312*a*, 312*b* connected between the low potential terminals of the primaries of the twin transformers 400*a*, 400*b*, and the negative power lead 80. A signal by-pass path around the power supply circuit is provided by the 2-microfarad condenser 314. In a similar manner, the collectors of the push-pull output amplifier stage A3 are biased negatively through the twin 25,000-ohm resistance elements 412*a* and 412*b* which are connected between the low potential terminals of the twin output transformers 500*a*, 500*b* and the power lead 80. A signal by-pass path is provided through the .5-microfarad capacitance element 414 connected across the power supply circuit.

Operation of the superheterodyne circuit of Fig. 4 for the reception of radio broadcast signals may be briefly described as follows: Radio signals are picked up by the antenna 50, whence they are impressed through the first coupling step-down transformer 100 on the two-stage radio frequency amplifier RF1 and RF2, the gain of which is adjusted to be maximum at the frequency of the desired signal by means of the manually controlled variable air condensers 120. The circuit is designed to operate in the standard broadcast band so that the frequency range covered by this adjustment is approximately 550 kilocycles to 1,500 kilocycles. The 600-ohm potential divider 119, which is connected across the secondary coil of the transformer 100 in the input of the RF2 stage, is used to reduce the gain of this stage to prevent the radio frequency amplifier from overloading when the receiver is operated in the presence of powerful broadcast transmitters. Following the RF2 stage, the oscillator stage, which is substantially similar to the oscillator shown in Fig. 26(*b*) on page 394 of The Bell System Technical Journal for July 1949, and described in application Serial No. 67,159 of H. L. Barney filed December 24, 1948, has its frequency controlled by a variable air capacitor 120′ mounted on the same shaft with the variable air condensers 120, which tune the RF1 and RF2 stages. This stage is designed so that the oscillator frequency is 465 kilocycles higher than the frequency at which the radio frequency stages are tuned, for all settings of the variable capacitors 120, 120′. The frequency of the oscillator therefore ranges from 465+550=1,015 kilocycles to 465+1,500=1,965 kilocycles.

The oscillator current and the signal from the RF2 stage are added together and fed to the input transformer 100 of the intermediate frequency amplifier IF1 by way of the first detector stage, which includes the germanium varistor 115, which operates as a diode, rectifying the combined oscillator and signal current. The result of the rectification process is to produce upper and lower side bands of the signal frequency about the oscillator frequency, the frequency of the lower side band being equal to the oscillator frequency minus the signal frequency, which therefore occupies a frequency band centered at 465 kilocycles. This side band is selected by the intermediate frequency amplifier, which comprises a circuit including three grounded base transistor stages, IF1, 2 and 3. Each stage has a tuned output circuit, including a condenser 117, whereby the gain of the amplifier is sharply peaked in a frequency band extending approximately ±10 kilocycles on either side of the 465-kilocycle frequency. Outside of this band, the gain of the intermediate frequency amplifier decreases rapidly, so that the unwanted signals are rejected.

The currents at the output of the intermediate frequency amplifier are fed into the second detector containing a second germanium varistor 115′, which operates to rectify the currents and thus convert them to audio frequency.

The volume control circuit 250, is connected across the transformer 200 at the output of the second detector stage and at the input to the first audio frequency stage A1, providing a manual adjustment for the strength of the audio signals. It comprises a double potentiometer arrangement which serves to present a reasonably constant impedance across the second detector output transformer 200 for all settings of the volume control.

As stated above, the second and third audio amplifier stages A2 and A3 each comprise a pair of transistors connected in push-pull relation in the conventional manner of push-pull vacuum tube circuits. The output power from the second push-pull stage is utilized to drive the loudspeaker unit 600 in the usual manner of the power amplifier stages in a vacuum tube radio receiver.

Subject matter related to the foregoing is described in an application of H. L. Barney, Serial No. 123,507, filed October 25, 1949.

What is claimed is:

1. In a signal translating circuit of which the active element may be any one of a number of transistors, each such transistor having a semiconductive body, a base electrode, an emitter electrode and a collector electrode engaging said body, said transistors being characterized by sporadic variances from unit to unit of emitter resistance, base resistance and optimum emitter-to-base operating voltage and being further characterized by a substantial uniformity, from unit to unit, of their translating behavior as a function of emitter bias current, said circuit having signal input terminals connected to the emitter electrode and to the base electrode, said circuit having a load and a collector potential source connected in series between the base electrode and the collector electrode, means for applying a substantially constant emitter bias current to the emitter electrode of said transistor of the order of 0.3 milliampere, which comprises the series combination of a second potential source with a resistor connected in series between said base electrode and said emitter electrode, the potential of said second source being at least ten volts, the resistance of said resistor being at least 30,000 ohms, and a condenser connected in series between said emitter electrode and one terminal of said second potential source to insure that said second potential source and resistor shall constitute the only external direct-current path interconnecting the emitter electrode and the base electrode.

2. In a signal translating circuit of which the active element may be any one of a number of transistors, each such transistor having a semiconductive body, a base electrode, an emitter electrode and a collector electrode engaging said body, said transistors being characterized by sporadic variances from unit to unit of emitter resistance, base resistance and optimum emitter-to-base operating voltage and being further characterized by substantial uniformity, from unit to unit, of their translating behavior as a function of emitter bias current, said circuit having signal input terminals connected to the emitter electrode and directly to the base electrode, said circuit having a load and a collector potential source connected in series between the base electrode and the collector electrode; means for applying a substantially constant emitter bias current to the emitter electrode of said transistor in a preassigned magnitude of the order of 0.3 milliampere, which comprises the series combination of a second potential source with a resistor connected in series between said base electrode and said emitter electrode, the potential of said second source being many times greater than the emitter-to-base operating potential difference encountered among said transistors, and at least ten volts, the resistance of said resistor being many times greater than the highest emitter-to-base transistor resistance encountered among said transistors, and at least 30,000 ohms, and a condenser connected in series between said emitter electrode and one terminal of said second potential source to insure that said second potential source and resistor shall constitute the only external direct-current path interconnecting the emitter electrode and the base electrode.

3. In a signal translating circuit which employs as its active element a transistor having a semiconductive body, an emitter electrode, a base electrode and a collector electrode engaging said body, input terminals connected to two of said electrodes and output terminals connected to one of said two electrodes and to the third of said electrodes, means for rendering the operation of said circuit substantially independent of peculiarities of the individual transistor employed which comprises a resistor and a source of steady potential connected in series with the emitter electrode, the potential of the source being many times greater than the greatest optimum emitter-to-base operating potential difference normally found in transistors, whereby said emitter electrode is supplied with a substantially constant current bias.

4. Apparatus as defined in claim 3 wherein the magnitude of the resistor is many times greater than that of the internal emitter-to-base resistance of the transistor.

CHARLES O. MALLINCKRODT.

References Cited in the file of this patent

UNITED STATES PATENTS

| Number | Name | Date |
|---|---|---|
| 1,745,175 | Lilienfeld | Jan. 28, 1930 |
| 2,020,297 | Buckley et al. | Nov. 12, 1935 |
| 2,476,323 | Rack | July 19, 1949 |
| 2,486,776 | Barney | Nov. 1, 1949 |
| 2,524,035 | Bardeen et al. | Oct. 3, 1950 |
| 2,541,322 | Barney | Feb. 13, 1951 |

OTHER REFERENCES

Physical Review, July 15, 1948, pp. 230–231. Copy in 179–171–MB.